(12) United States Patent
Miyazaki

(10) Patent No.: US 6,206,380 B1
(45) Date of Patent: Mar. 27, 2001

(54) SEAL DEVICE FOR ROLLING BEARING

(75) Inventor: Hiroya Miyazaki, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/038,897

(22) Filed: Mar. 12, 1998

(30) Foreign Application Priority Data

Mar. 12, 1997 (JP) .................................................. 9-057840

(51) Int. Cl.$^7$ ...................................................... F16J 15/32
(52) U.S. Cl. .......................... 277/551; 277/560; 277/562; 277/571
(58) Field of Search .................. 277/409, 549, 277/551, 560, 562, 565, 571

(56) References Cited

U.S. PATENT DOCUMENTS

| 3,341,265 | * | 9/1967 | Paterson | 277/549 |
| 4,792,243 | | 12/1988 | Takeuchi et al. | |
| 4,819,949 | | 4/1989 | Otto | |
| 5,649,710 | * | 7/1997 | Kanda | 277/549 |
| 5,947,611 | * | 9/1999 | Nagase | 384/448 |

FOREIGN PATENT DOCUMENTS

| 0 495 323 | 7/1992 | (EP) . |
| 0 607 719 | 7/1994 | (EP) . |
| 0 753 679 | 1/1997 | (EP) . |
| 0 785 369 | 7/1997 | (EP) . |
| 2-52140 | 11/1990 | (JP) . |
| 2-146221 | 12/1990 | (JP) . |
| 3-121224 | 12/1991 | (JP) . |
| 4-126064 | 11/1992 | (JP) . |

* cited by examiner

Primary Examiner—Anthony Knight
Assistant Examiner—Alison K. Pickard
(74) Attorney, Agent, or Firm—Evenson, McKeown, Edwards & Lenahan, P.L.L.C.

(57) ABSTRACT

A seal device for the rolling bearing has an inner seal lip which never turns over when the inner seal lip with its tip end edge separated from the outer peripheral surface of the cylindrical portion of the slinger is fitted onto the cylindrical portion of the slinger, so that the inner seal lip is not resiliently deformed, or very little resiliently deformed while the tip end edge of the inner seal lip is fitted onto the cylindrical portion of the slinger.

5 Claims, 9 Drawing Sheets

SEAL DEVICE FOR ROLLING BEARING

TECHNICAL FIELD OF THE INVENTION

The present invention is related to a seal device for a rolling bearing, for an example, to be installed in any of a support apparatus for automobile vehicle or a rotational support portion in various industrial machines and apparatus.

BACKGROUND OF THE INVENTION

Various machines and apparatus have rotational support portions in which rolling bearings such as ball bearings, roller bearings or tapered roller bearings are installed. Such rolling bearings have seal devices installed therein, so that grease filled in the interior of the rolling bearings is prevented from leaking out or various kinds of foreign matter such as rain water or dust on the outside are kept from entering the interior of the rolling bearings.

FIGS. 1 to 3 show three examples of conventional seal devices installed in the opening portion at one end of a rolling bearing for the purposes mentioned above.

FIG. 1 shows a first example of the conventional seal device structures as disclosed in Japanese Patent Publication Tokuko Hei2-52140, which comprises a radially outer seal ring 3 and a radially inner seal ring 4 in combination. This seal device is mounted between an outer ring 8 and an inner ring 11, portions of which are illustrated in FIG. 1. The rotational center of the outer and inner rings 8, 11 is located on the lower side of the inner ring 11 in FIG. 1. The radially outer seal ring 3 comprises a reinforcing metal member 1a and a seal member 2a, and the radially inner seal ring 4 comprises a reinforcing metal member 1b and a seal member 2b, In this structure, the seal member 2a of the seal ring 4 is formed with one or two seal lips having a tip end edge placed in sliding contact with a surface portion of the reinforcing metal member 1a of the mating seal ring 3, while the seal member 2b of the seal ring 3 is formed with one or two seal lips having a tip end edge placed in sliding contact with a surface portion of the reinforcing metal 1b of the mating seal ring 4.

FIG. 2 shows a second example of the conventional seal device structures as disclosed in Japanese Utility Model Publication JitsuKaiHei 2-146221, which comprises a reinforcing metal member 5, a slinger 6 and seal member 7. This seal device is mounted between an outer ring 8 and an inner ring 11, portions of which are illustrated in FIG. 2. The rotational center of the outer and inner rings 8, 11 is located on the lower side of the inner ring 11 in FIG. 2.

The seal member 5 is formed in an annular shape with a L shaped cross section, and comprises a radially outer cylindrical portion 9 and a radially inner ring portion 10. The radially outer cylindrical portion 9 is adapted to be fitted into and fixed to the inner peripheral portion at one end of the outer ring 8, and the radially inner ring portion 10 extends radially inwards from the axially inner end edge of the cylindrical portion 9. The term "axially inner end edge" is used to mean the end edge closer to the axially central portion of the rolling bearing (the left end edge in FIG. 2).

The slinger 6 is formed in an annular shape with an L shaped cross section, and comprises a radially inner cylindrical portion 12 and a radially outer ring portion 13. The radially inner cylindrical portion 12 is adapted to be fitted onto and fixed to the outer peripheral portion at one end of the inner ring 11, and the radially outer., ring portion 13 extends radially outwards from the anally outer end edge of the cylindrical portion 12. The term "axially outer end edge" is used to mean the end edge closer to the axial opening portion of the rolling bearing (the right end edge in FIG. 2).

The seal member 7 is made of an elastic material such as rubber or elastomer and has a base portion 7a and three seal lips, i.e. outer seal lip 14, intermediate seal lip 15 and inner seal lip 16. The base portion 7a is securely connected to the reinforcing metal 5.

The outermost seal lip 14 has a tip end edge placed in sliding contact with an axially inner surface portion of the ring portion 13 of the slinger 6 and the remaining seal lips, i.e intermediate seal lip 15 and inner seal lip 16, have tip end edges placed in sliding contact with the outer peripheral surface portion of the cylindrical portion 12 of the slinger 6.

FIG. 3 shows a third example of the conventional seal device structures as disclosed in Japanese Utility Model Publication JitsuKaiHei 3-121224, which is formed in a structure similar to that of the second example in FIG. 2, except that the innermost seal lip 16 of the three seal lips of the seal member 7 is tilted in a direction opposite to that of the second example, with its tip end edge closer to the axial central portion of the rolling bearing.

The three examples mentioned above are still required to be improved in some points as follows;

In the example of FIG. 1, the radially outer and inner seal rings 3, 4 comprising the reinforcing metal members 1a, 1b and the seal members 2a, 2b, are troublesome in manufacturing so as to increase the cost of the whole seal device.

In the example of FIG. 2, the tip end edge of the inner seal lip 16 is inclined to be separated from the outer peripheral surface of the cylindrical portion 12 of the slinger 6 before installing the seal device to the open end portion of the rolling bearing or before installing the rolling bearing with the seal device to a rotational support portion.

Once the tip end edge of the seal lip 16 is separated from the outer peripheral surface of the cylindrical portion 12 of the slinger 6, the inner seal lip 16 often turns over when the tip end edge of the seal lip 16 is fitted onto the outer peripheral surface of the cylindrical portion 12 of the slinger 6 by relatively axially moving the reinforcing metal member 5 and slinger 6 closer to each other. In the turned-over state, the contact pressure between the tip end edge of the seal lip 16 aid the outer peripheral surface of the cylindrical portion 12 of the slinger 6 is excessively large, so that the rotational torque, that is rotational resistance in the rolling bearing with the seal device installed therein, becomes large and the seal performance becomes instable.

In order to avoid such problems, the axial length of the cylindrical portion 12 may be enlarged, or the tip end edge of the inner seal lip 16 can be made closer to the ring portion 13 of the slinger 6 to increase the axial length between the tip end edge of the inner seal lip 16 and the axially inner end edge of the cylindrical portion 12 of the slinger 6. However, if the axial length of the cylindrical portion 12 is enlarged, the installation space of the seal device will sometimes become intolerably large. And, if the tip end edge of the inner seal lip 16 is made closer to the ring portion 13 of the slinger 6, the distance between the tip end edge of the seal lip 16 and the tip end edge of the intermediate seal lip 15 is too short to cause interference therebetween so as to worsen the seal performance.

In the example of FIG. 3, even if the tip end edge of the seal lip 16 is separated from the outer peripheral surface of the cylindrical portion, 12 of the slinger 6, the inner seal lip 16 never turns over when the tip end edge of the seal lip 16 is fitted onto the outer peripheral surface of the cylindrical portion 12 of the slinger 6. However, when the performance of the inner seal lip 16 for preventing grease leakage is too perfect, grease hardly reaches the sliding contact portions between the intermediate and outer seal lips 15, 16 and the slinger 6. Accordingly, the wear at the sliding contact portions can become large and the seal performance can be worsened at the sliding contact portions.

In addition, when the root portion 16a of the inner seal lip 16 and the root portion 15a of the intermediate seal lip 15, connected to the base portion 7a, are close to each other, the seal performance is worsened due to the interference between the inner and intermediate seal lips 16, 15.

SUMMARY OF THE INVENTION

An object of the present invention is to provide a seal device to overcome the problems as mentioned above, wherein the radially inner seal lip is prevented from turning over and the grease leakage is prevented.

DETAILED DESCRIPTION OF THE PREFERRED EMBODIMENTS

According to one embodiment of the present invention, the seal device is installed in the rolling bearing, comprising an inner ring having an outer peripheral surface formed with an inner ring raceway and, an outer ring having an inner peripheral surface formed with an outer ring raceway, and a plurality of rolling members provided between the inner and outer ring raceways for relative rotation of the inner and outer rings, so as to close up an end portion of the rolling bearing between the outer peripheral surface o f the inner ring and the inner peripheral surface of the outer ring.

Figure 1:
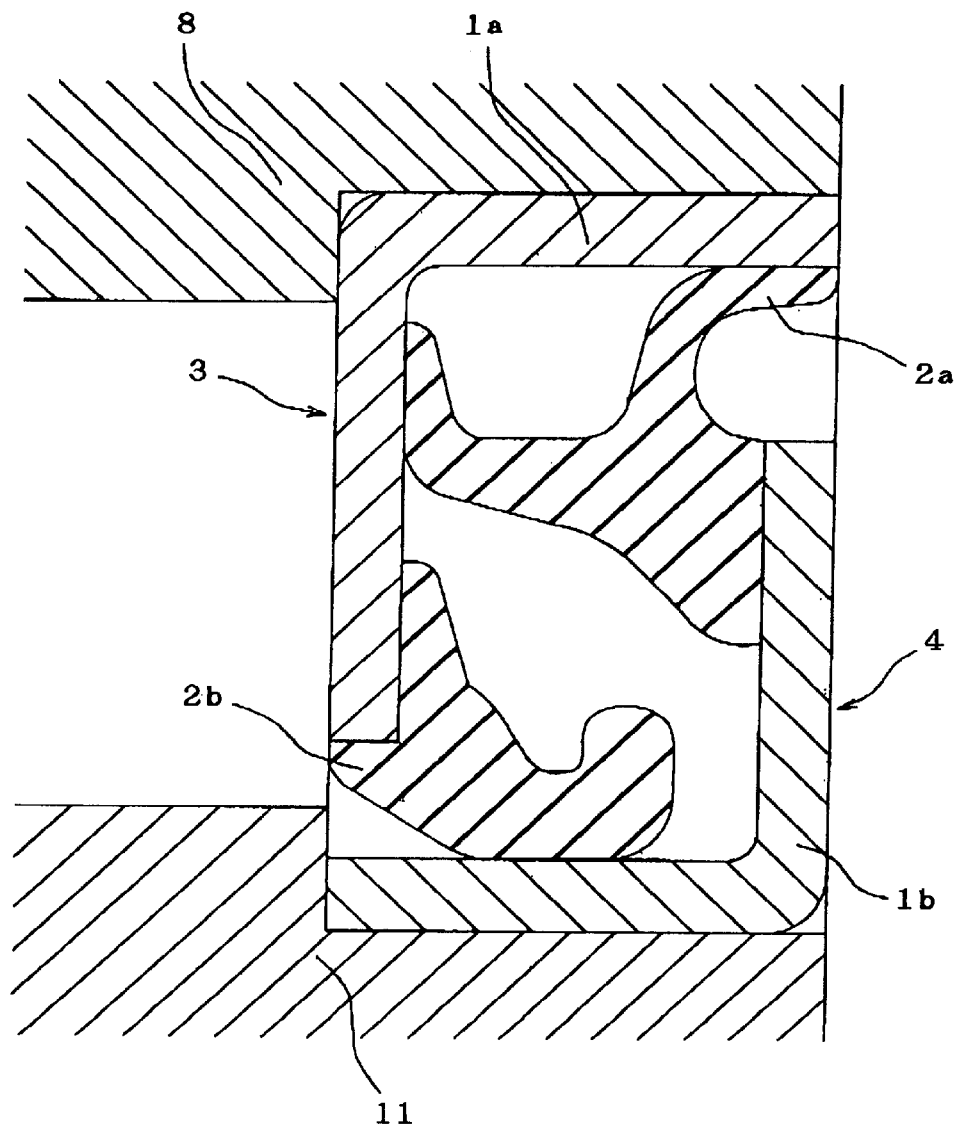
FIG. 1 is a cross sectional view of an example of a conventional seal device.
Figure 2:
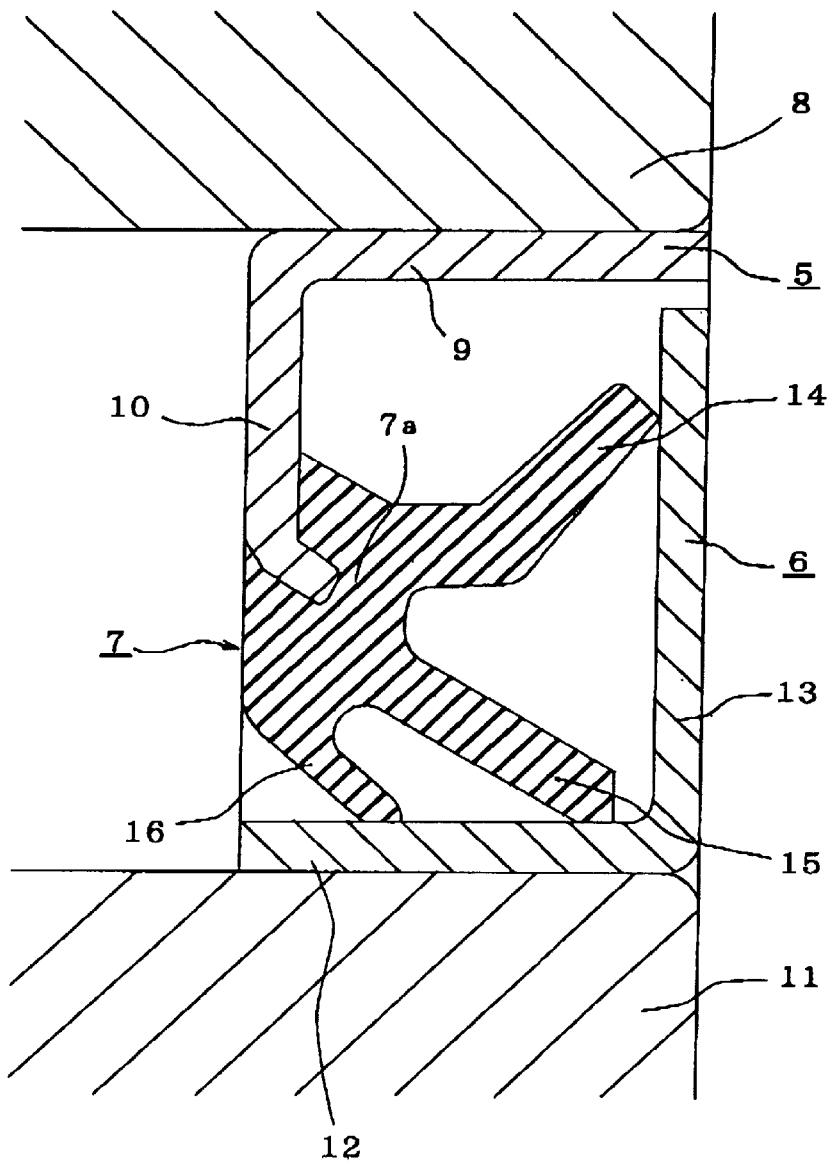
FIG. 2 is a cross sectional view of another example of a conventional seal device.
Figure 3:
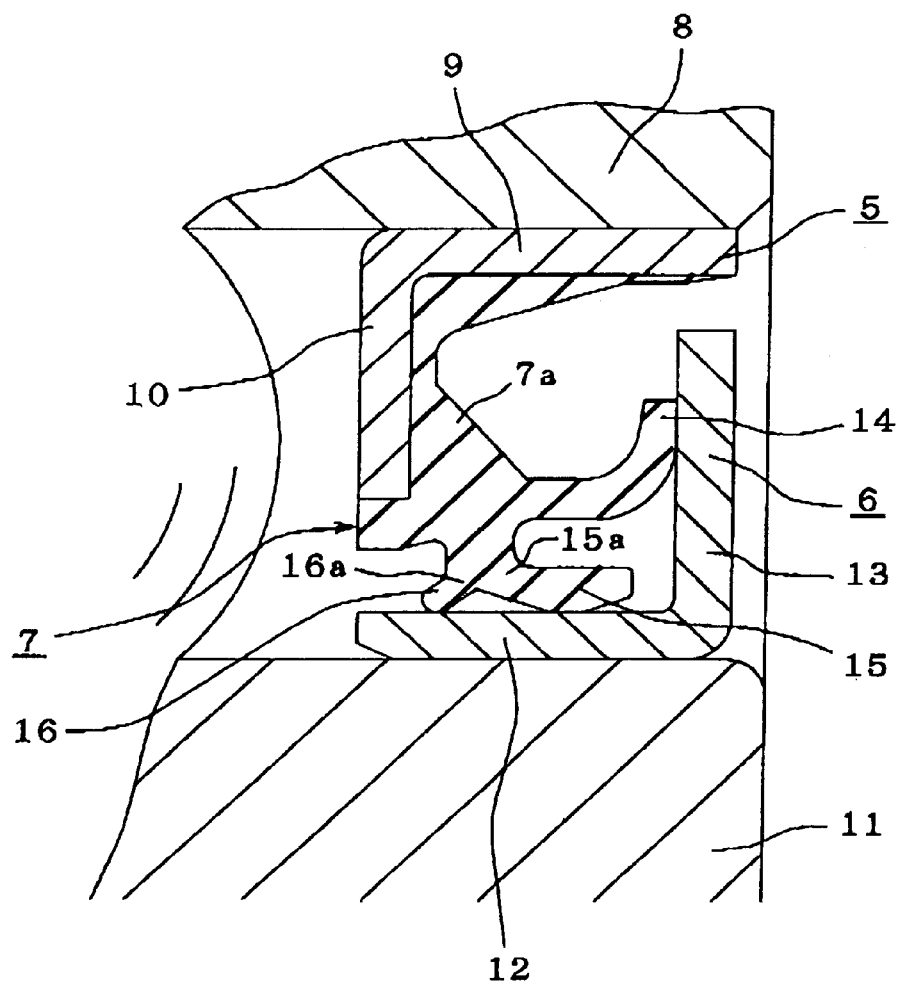
FIG. 3 is a cross sectional view of another example of a conventional seal device.

The seal device for the rolling bearing of the present invention comprises a metal member, slinger and seal member as in the conventional structure of FIG. 2 to be provided between an outer ring and an inner ring.

The metal member is comprised of a radially outer cylindrical portion to be fitted into the inner peripheral surface at one end of the outer ring, and a radially inner ring portion extending radially inwards from the axially inner end edge of the radially outer cylindrical portion, and formed in a generally annular shape.

The seal member is made of a resilient material and has a base portion and three seal lips with the base portion connected to the member. The outermost one of the three lips has a tip end edge placed in sliding contact with the axially inner surface of the ring portion of the slinger. The remaining two lips, that is the intermediate and innermost seal lips, have tip end edges in sliding contact with the outer peripheral surface of the cylindrical portion.

The three seal lips mentioned above are tilted such that the tip edge of each lip is to the outside of the rolling bearing. In addition, in the state where the tip end edge of the innermost seal lip is engaged with the outer peripheral surface of the cylindrical portion of the slinger, the innermost seal lip is not resiliently deformed, or very little resiliently deformed, with substantially zero interference.

With this seal device for the rolling bearing, the inner seal lip with its tip end edge separated from the outer peripheral surface of the cylindrical portion of the slinger is fitted onto the cylindrical portion of the slinger. The inner seal lip never turns over. In other words, the tip end edge of the inner seal lip is fitted onto the cylindrical portion of the slinger so that the interference therebetween is substantially zero. Therefore, the innermost seal lip is not resiliently deformed, or resiliently deformed very little while the tip end edge of the inner seal lip is fitted onto the cylindrical portion of the slinger. Accordingly, there is no or very little friction between the tip end edge of the inner seal lip and the outer peripheral surface of the cylindrical portion of the slinger during a fitting process, causing no force which turns over the inner seal lip.

Since the three seal lips mentioned above are tilted such that the tip end edges are closest to the outside of the rolling bearing, the grease filled in the interior of the rolling bearing is moderately supplied to the sliding contact portion between the tip end edges of the seal lips and the slinger, keeping the lubrication well in the sliding contact portions, keeping small the rotational torque of the rolling bearing and keeping sufficient seal performance at the sliding contact portions.

Since the root portions of the seal lips connected to the base portion are separated from each other, there is no interference between the adjacent seal lips, so that the tip end edge of the seal lips follows the movement of the surface of the slinger due to the eccentricity of the shaft etc. well in order to secure good seal performance.

Figure 4:
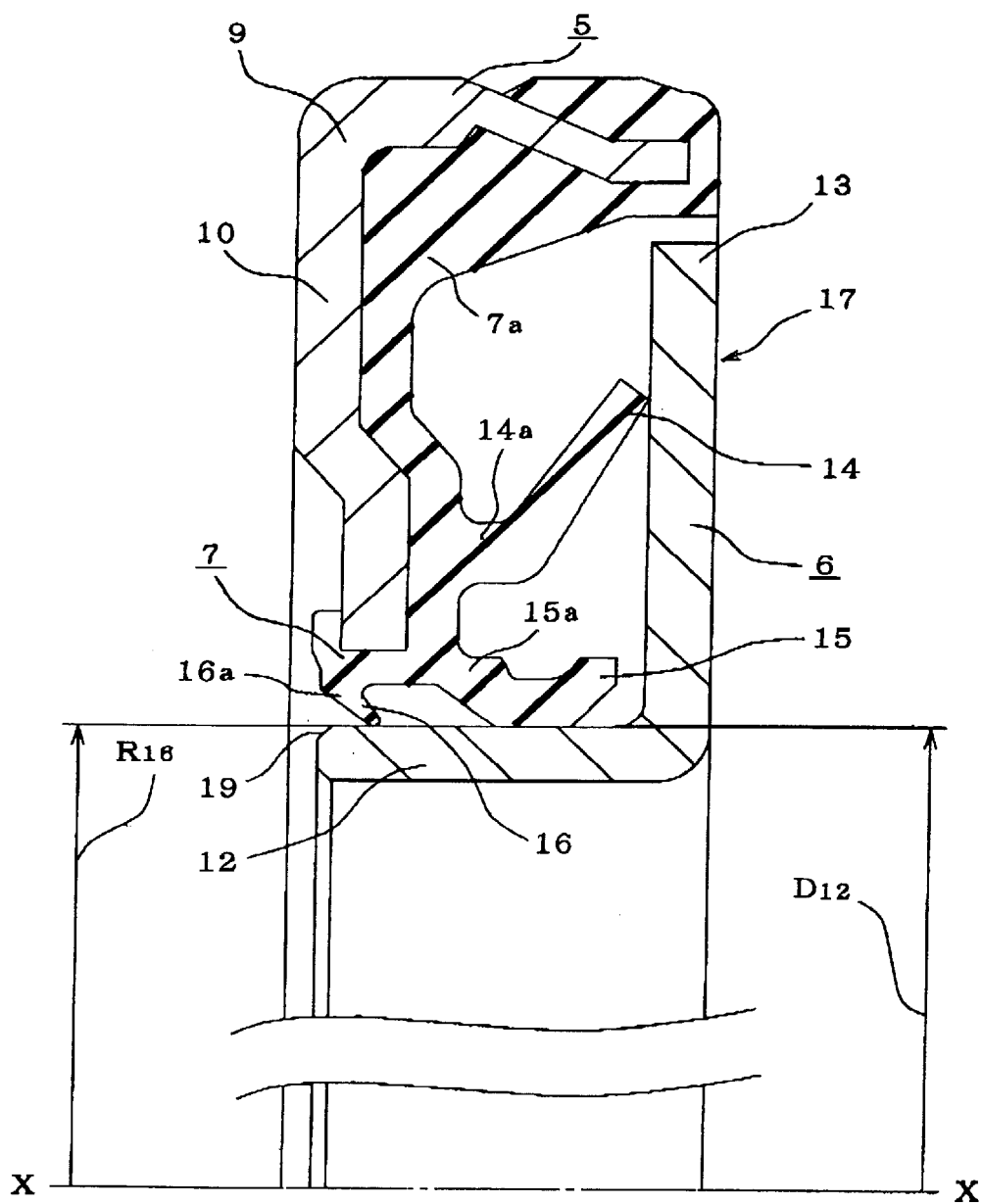
FIG. 4 is a cross sectional view of an example of the seal device according to the present invention.
Figure 5:
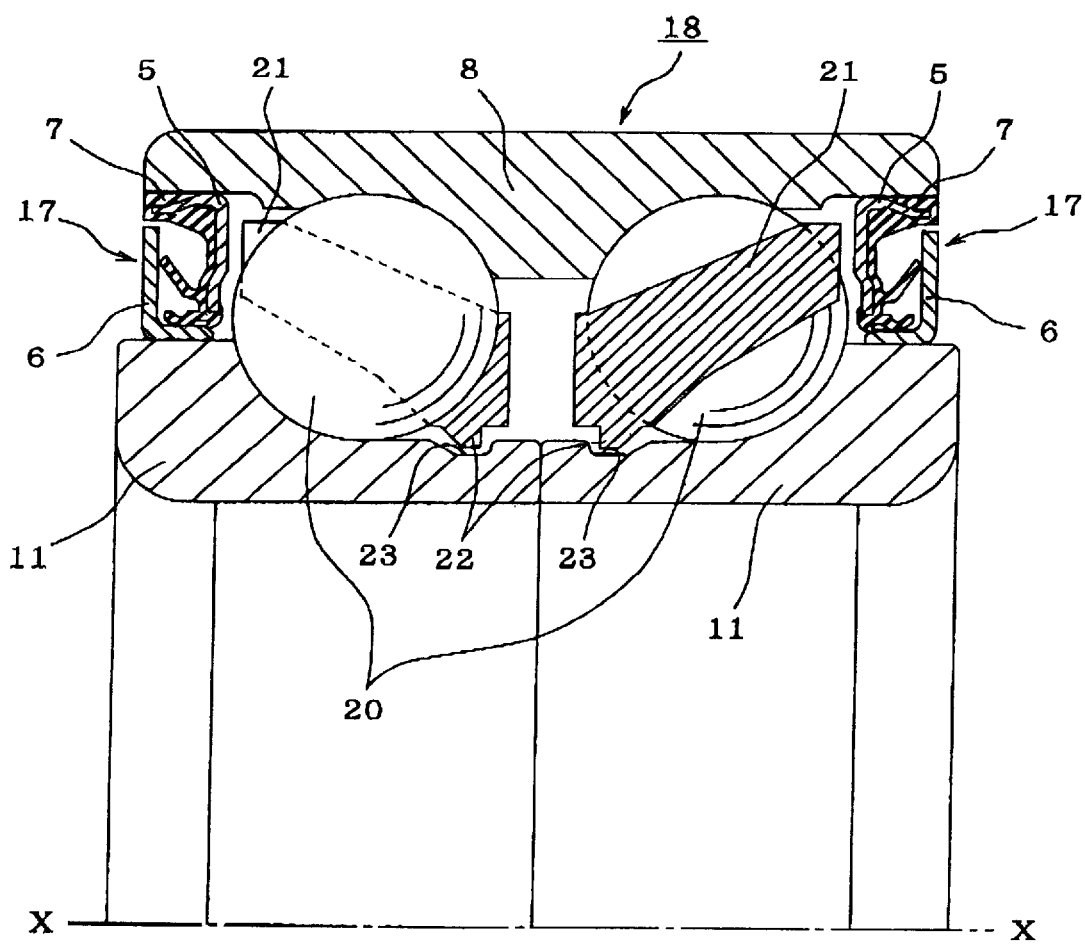
FIG. 5 is a cross sectional view of an example of the rolling bearing with a seal device according to the present invention fitted therein.

Now, FIGS. 4 and 5 show an example of the present invention. The seal device 17 of this example comprises a reinforcing metal member 5, slinger 6 and seal member 7.

The reinforcing metal member 5 is made of e.g. carbon steel plate, subjected to blanking e.g. punching or pressing and plastic process, and formed in an integral structure. The reinforcing metal member 5 is formed in a generally annular shape with a substantially L shaped cross section so as to have a radially outer cylindrical portion 9 to be fitted into the inner peripheral surface at one end of the outer ring 8 of the rolling bearing 18, and a radially inner ring portion 10 extending radially inwards from the axially inner end edge (left end edge in FIG. 4) of the radially outer cylindrical portion 9.

The slinger 6 is made of a corrosion resistant metal plate such as a stainless steel plate subjected to blanking e.g. punching or pressing and plastic process and formed in an integral structure. The slinger 6 is formed in a generally annular shape with a substantially L shaped cross section so as to have a radially inner cylindrical portion 12 to be fitted onto the outer peripheral surface at the axially outer end of the inner ring 11 of the rolling bearing 18, and a radially outer ring portion 13 extending radially outwards from the axially outer end edge (right end edge in FIG. 4) of the radially inner cylindrical portion 12.

The seal member 7 is made of a resilient material to have a base portion 7a and three seal lips 14, 15, 16 with the base portion 7a connected to the reinforcing member 5. The outermost seal lip 14 has a tip end edge placed in sliding contact with the axially inner surface of the outer ring portion 13 of the slinger 6. The remaining two lips, that is intermediate seal lip 15 and innermost seal lip 16, each have a tip end edge in sliding contact with the outer peripheral surface of the cylindrical portion 12 of the slinger 6.

The base portion 7a of the seal member 7 covers the inner and outer peripheral surfaces of the tip half portion (right half portion in FIG. 4) of the cylindrical portion 9 of the reinforcing metal member 5.

The three seal lips 14, 15, 16 are tilted such that the respective tip end edges thereof are closest to the outside space of the rolling bearing. In addition, where the tip end edge of the innermost seal lip 16 is engaged with the outer peripheral surface of the cylindrical portion 12 of the slinger 6, the seal lip 16 is not resiliently deformed, or very little resiliently deformed, is in substantially zero interference. Accordingly, the inner diameter of the seat lip 16 in a free condition is substantially the same as the outer diameter of the cylindrical portion 12 of the slinger 6.

For example, when the rolling bearing is used to support the road wheel of an automobile, the diameter $D_{12}$ of the cylindrical portion 12 is in the range of about 40 mm and about 70 mm. In this case, the inner diameter $R_{16}$ of the seal lip 16 at the free condition is controlled to be at least the value of $D_{12}$–0.5 mm and up to $D_{12}$±0.2 mm. That is, $\{(D_{12}-0.5 \text{ mm}) \leq R_{16} \leq (D_{12}+0.2 \text{ mm})\}$.

In FIGS. 4 and 5, the line X—X represents the rotational center of the rolling bearing 18 and the seal device 17.

In the structure as mentioned above, the seal member 7 is attached to the reinforcing metal member 5, but no seal member is attached to the slinger 6. Therefore, the slinger 6 is easily manufactured, and the production cost of the seal device 17 comprising the slinger 6, reinforcing metal member 5 and seal member 7 can be lowered.

The inner seal lip 16 never turns over when the seal lip 16 is fitted onto the cylindrical portion 12 of the slinger 6 from the state where the tip end edge of the inner seal lip 16 is separated from the outer peripheral surface of the cylindrical portion 12 of the slinger 6 before installing the seal device 17 to the open end portion of the rolling bearing I 8, or before installing the rolling bearing 18 within the seal device to a rotational support portion.

A pair of inner rings 1I with the seal device 17 installed therein according to the present invention is used in the rolling bearing t8 as shown in FIG. 5, and never separated from the outer ring 8 because of the engagement between the protrusions 22 formed on the cages 21 with rolling members 20 rotatably supported therein and recesses 23 formed in the inner rings 11.

However before installing the rolling bearing 18 in the rotational support portion, the inner rings 11 are axially displaced with reference to the outer ring 8 in the range that the protrusions 22 are displaced in the recesses 23. Due to this displacement, the tip end edge of the inner seal lip 16 can be separated from the cylindrical portion 12. Even in this condition, although the tip end edge of the inner seal lip 16 is fitted onto the cylindrical portion 12 when the rolling bearing 18 is installed in the rotational support portion, the inner seal lip 16 never turns over.

Specifically, since the tip end edge of the inner seal lip 16 is fitted onto the outer peripheral surface of the cylindrical portion 12 of the slinger 6 with substantially zero interference, the inner seal lip 16 is not resiliently deformed, or is resiliently deformed very little during the fitting process. Accordingly, there is no or very little friction between the tip end edge of the inner seal lip 16 and the outer peripheral surface of the cylindrical portion 12 of the slinger 6 during the fitting process, causing no force on the seal lip 16 to turn over the inner seal lip 16.

Particularly, since a chamfered portion 19 is provided on the end edge of the cylindrical portion 12, the fitting process of the seal lip 16 onto the cylindrical portion 12 is smoothly carried out, positively preventing the seal lip 16 from turning over.

Since the three seal lips 14, 15, 16 are tilted such that their respective tip end edges are closer to the outside space of the rolling bearing 18, respectively, the grease filled in the interior of the rolling bearing 18 is moderately supplied to the sliding contact portion between the tip end edge of the seal lips 14, 15, 16 and the slinger 6. Accordingly, the lubrication of the sliding contact portions can be kept good, and the rotational torque of the rolling bearing 18 and the seal . . . performance of the sliding contact portions is sufficiently maintained. In addition, since the root portions 14a, 15a, 16a of the seal lips 14, 15, 16 are separated from each other, there is no interference between the adjacent seal lips, so that the tip end edge of the seal lips 14, 15, 16 follows movement of the surface of the slinger 5, due to the eccentricity etc. of the shaft with the inner rings 11 fitted thereon, well, thereby securing good seal performance.

In the structure as illustrated, the inner and outer peripheral surfaces of the tip half portion (right portion in FIG. 4) of the cylindrical portion 9 of the reinforcing metal member 5 and the axially outer surface of the ring portion 10 are covered by the seal member 7. Consequently, the reinforcing metal member 5 is never exposed to rain water etc. on the outside of the rolling bearing 18, and the reinforcing metal member 5, even when made of an inexpensive low carbon steel plate, is hardly eroded.

In the state where the reinforcing metal member 5 is fitted into the end portion of the outer ring 8, the portion of the seal member 7 covering the outer peripheral surface of the tip half portion of the cylindrical member 9 is resiliently supported between the outer peripheral surface of the tip half portion of the cylindrical portion 9 and the inner peripheral portion of the outer ring 8 for a positive seal therebetween.

Figure 6:
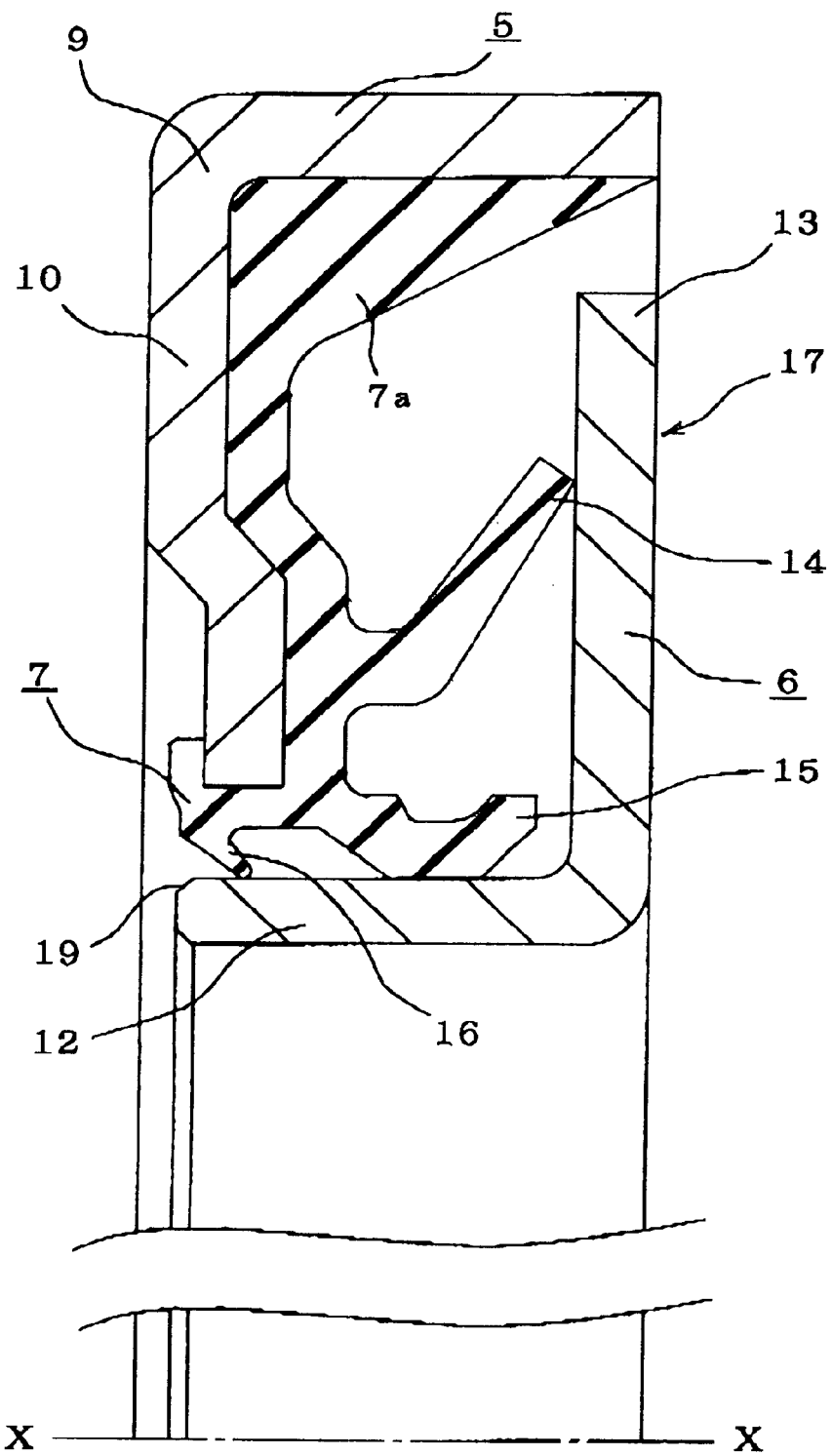
FIG. 6 is a cross sectional view of another example of the seal device according to the present invention.

FIG. 6 discloses another example of the present invention, where the cylindrical portion 9 of the reinforcing metal member 5 is formed in a simple cylindrical shape, and the seal member 7 covers only the inner peripheral surface of the cylindrical portion 9. In the state where the reinforcing metal member 5 is fitted into the outer ring 8 (FIG. 5), the end edge (right end edge in FIG. 6) of the cylindrical portion 9 is exposed to foreign matter such as rain water. Accordingly, if the reinforcing metal member S is made of an inexpensive low carbon steel plate which is easily eroded, the erosion of the reinforcing metal member 5 would unavoidably start form the end edge of the cylindrical portion 9. However, the axial length of the cylindrical portion 9 is so large as to secure practically sufficient durability. In addition, the practically sufficient seal performance between the outer peripheral surface of the cylindrical portion 9 and the inner peripheral surface of the outer ring 8 is secured, although it is less than the seal performance of the example of FIGS. 4 and 5.

Figure 7:
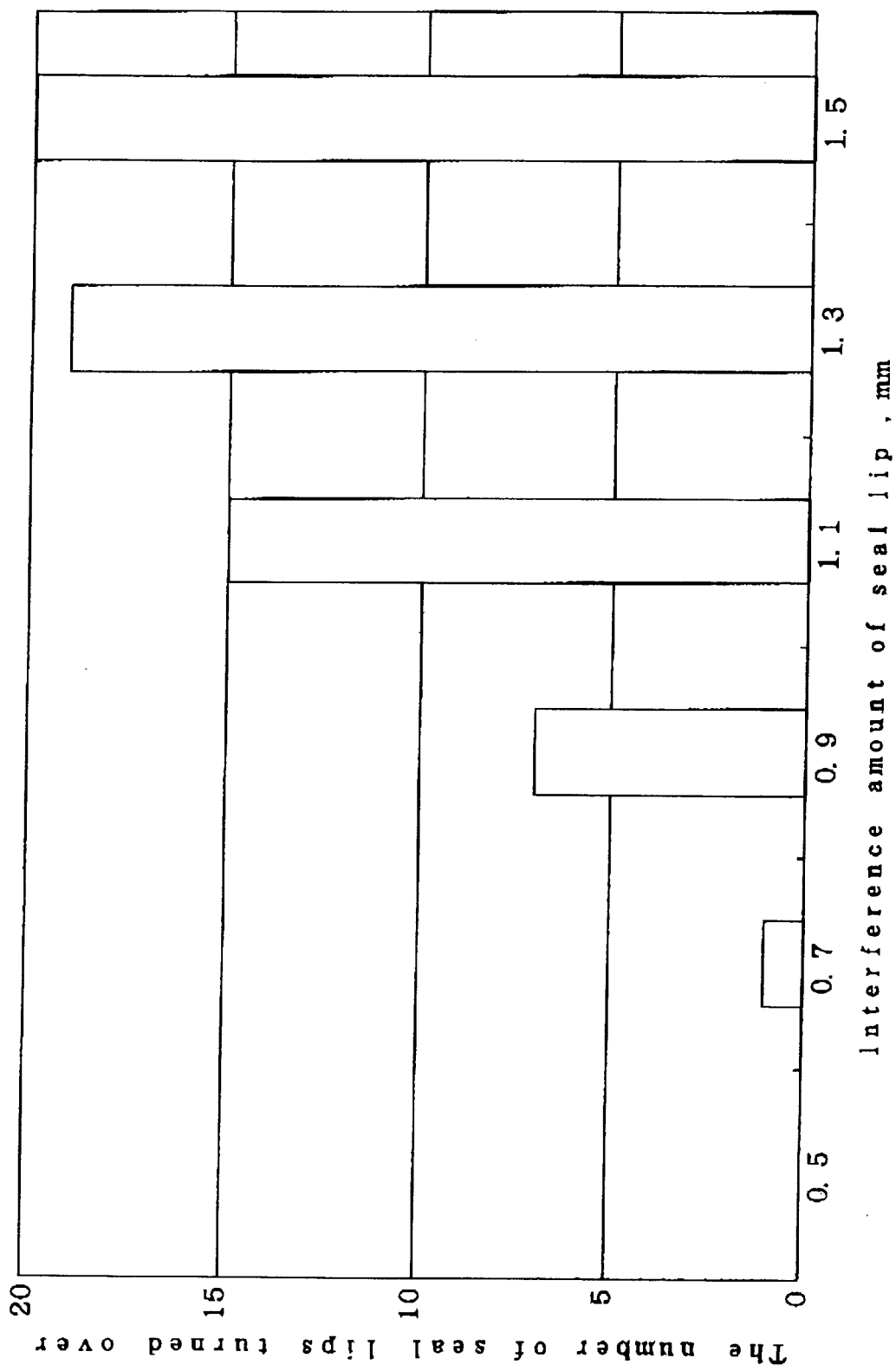
FIG. 7 is a graph showing test data between the seal lip interference and the number of the seal lips which are turned over.
Figure 8:
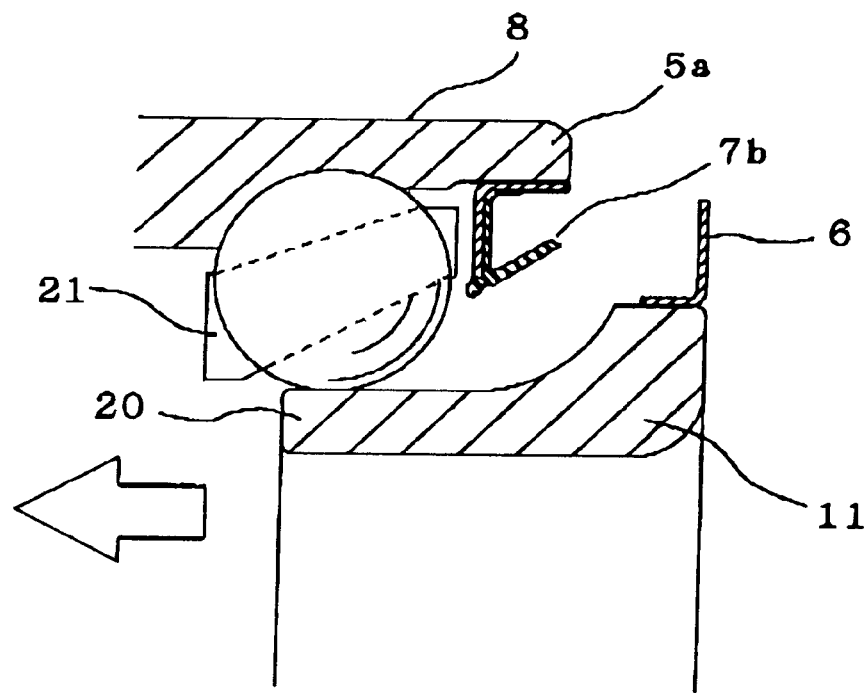
FIG. 8 is a cross sectional view of a portion of the rolling bearing where a seal device is provided, which is used for the Sing over test of the seal lip.

FIG. 7 shows a graph of test data on the relation between the seal lip interference and the number of the seal lips which turned over.

The test conditions are as follows:

the seal member 7 with the intermediate seal lip removed was mounted adjacent the ball 20 to the outer ring 8 for this test, twenty inner rings 11 with different interference amounts between 0.7 mm and 1.5 mm were tested by inserting each inner ring 11 into the outer ring 8 as illustrated by an arrow in FIG. 7, and the inner seal lip was checked whether it turned over during inserting.

Figure 9:
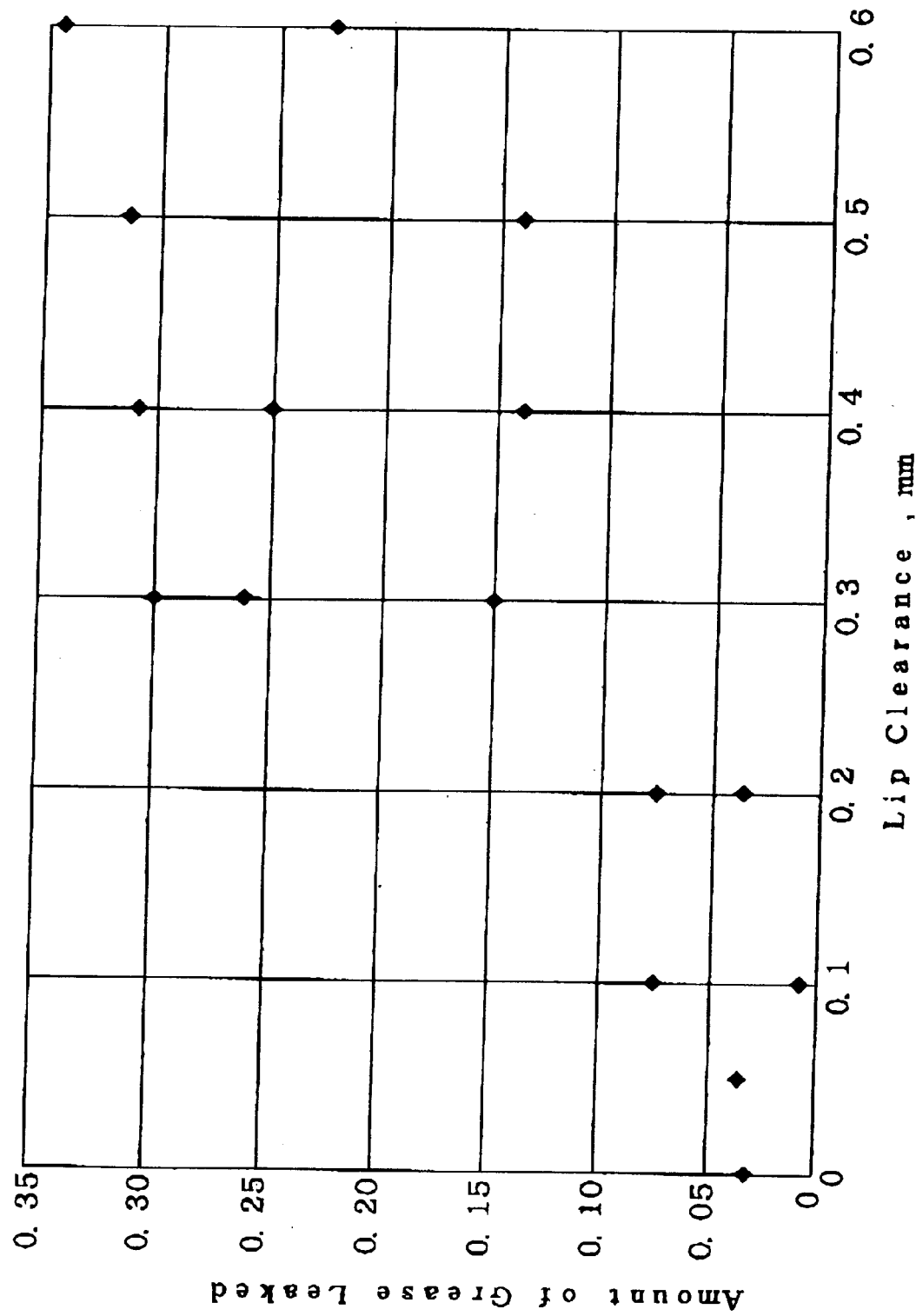
FIG. 9 is a graph showing test data between the seal lip clearance and the amount of grease leaked.

FIG. 9 shows a graph of test data on the relation between the seal lip clearance and the amount of grease leaked out of the seal lip clearance.

The test conditions are as follows:

A load was applied to bearing corresponding to the straight traveling, the bearing was operated with the rotational speed of 2,500 rpm during the period of time of 24 hours, and the amount of the grease leaked out of the bearing was checked.

The present invention provides a seal device to keep small the rotational torque of the rolling bearing having the seal device therein, the seal device having good durability and seal performance and produced at an inexpensive cost. The present invention is not limited to the examples shown in the specification.

What is claimed is:

1. A seal device for use in a rolling bearing comprising an inner ring having an outer peripheral surface formed with an inner ring raceway and an outer ring having an inner peripheral surface formed with an outer ring raceway and a plurality of rolling members provided between the inner and outer ring raceways for relative rotation of the inner and outer rings, the seal device comprising a metal member, a slinger and a seal member and being provided between the outer ring and the inner ring so as to close up an end open portion of the rolling bearing between the outer peripheral surface of the inner ring and the inner peripheral surface of the outer ring, the metal member comprising a radially outer cylindrical portion to be fitted into the inner peripheral surface at one end of the outer ring, and a radially inner ring portion extending radially inwards from an axially inner end of the radially outer cylindrical portion, and formed in a generally annular shape, the slinger comprising a radially inner cylindrical portion to be fitted onto the outer peripheral surface at one end of the inner ring, and a radially outer ring portion extending radially outwards from an axially outer end of the radially inner cylindrical portion, and formed in a generally annular shape, the seal member being made of a resilient material and comprising a base portion and outer, intermediate and inner seal lips, the base portion being connected to the metal member, the outer seal lip having a tip end edge placed in sliding contact with an axially inner surface of the ring portion of the slinger, the intermediate and inner seal lips having tip end edges in sliding contact with an outer peripheral surface of the cylindrical portion of the slinger, the outer, intermediate and inner seal lips being tilted such that respective tip end edges thereof are closest to an outside of the rolling bearing, wherein when the tip end edge of the inner seal lip is engaged with the outer peripheral surface of the cylindrical portion of the slinger, the inner seal lip is provided substantially without resilient deformation, whereby the inner seal lip is not turned over.

2. The seal device of claim 1, wherein when an outer diameter of the radially inner cylindrical portion of the slinger is $D_{12}$, an inner diameter of the inner seal lip, in a free condition, is controlled to be at least $D_{12}-0.5$ mm and up to $D_{12}+0.2$ mm.

3. The seal device of claim 2, wherein $D_{12}$ is in the range of about 40 mm and about 70 mm.

4. The seal device of claim 1, wherein the inner seal lip, in a free condition, has a diameter which is substantially the same as an outer diameter of the cylindrical portion of the slinger.

5. The seal device of claim 1, wherein the radially inner cylindrical portion of the slinger has an end edge formed with a chamfered portion about which the inner seal lip is to be received.

* * * * *